US006751019B2

United States Patent
DeSanto et al.

(10) Patent No.: US 6,751,019 B2
(45) Date of Patent: Jun. 15, 2004

(54) ULTRATHIN MESH OPTICAL PANEL AND A METHOD OF MAKING AN ULTRATHIN MESH OPTICAL PANEL

(75) Inventors: Leonard DeSanto, Dunkirk, MD (US); Calvin Brewster, North Patchogue, NY (US)

(73) Assignee: Scram Technologies, Inc., Dunkirk, MD (US)

( * ) Notice: Subject to any disclaimer, the term of this patent is extended or adjusted under 35 U.S.C. 154(b) by 0 days.

(21) Appl. No.: 09/879,437

(22) Filed: Jun. 11, 2001

(65) Prior Publication Data

US 2002/0186465 A1 Dec. 12, 2002

(51) Int. Cl.[7] .................. G03B 21/56; G03B 21/14; G03B 21/28; G03H 1/00; G02B 6/10
(52) U.S. Cl. .................. 359/460; 359/34; 359/449; 353/70; 353/98; 353/122; 385/129; 385/901
(58) Field of Search .................. 353/69, 70, 98, 353/122; 385/129, 901; 359/460, 34, 443, 449

(56) References Cited

U.S. PATENT DOCUMENTS

| | | | |
|---|---|---|---|
| 3,247,756 A | 4/1966 | Seigmund | 385/120 |
| 3,797,910 A | 3/1974 | Westwig | 385/120 |
| 5,181,130 A | 1/1993 | Hubby, Jr. | 349/63 |
| 5,329,386 A | 7/1994 | Birecki et al. | 349/63 |
| 5,543,870 A | 8/1996 | Blanchard | 353/74 |
| 5,594,561 A | 1/1997 | Blanchard | 349/59 |
| 5,625,736 A | 4/1997 | Veligdan | 385/120 |
| 5,815,625 A | 9/1998 | Sugawara | 385/120 |
| 5,870,224 A | 2/1999 | Saitoh et al. | 359/456 |
| 5,949,942 A | 9/1999 | O'Conner | 385/129 |
| 6,002,826 A * | 12/1999 | Veligdan | 385/120 |
| 6,017,630 A * | 1/2000 | Tanaka et al. | 428/402 |
| 6,222,971 B1 * | 4/2001 | Veligdan et al. | 385/120 |
| 6,301,417 B1 * | 10/2001 | Biscardi et al. | 385/120 |
| 6,307,675 B1 | 10/2001 | Abe et al. | 359/457 |
| 6,317,545 B1 * | 11/2001 | Veligdan | 385/120 |
| 6,331,878 B1 * | 12/2001 | Takahara | 349/5 |
| 6,389,206 B1 * | 5/2002 | Veligdan | 385/120 |
| 6,400,876 B1 * | 6/2002 | Biscardi et al. | 385/120 |
| 6,487,350 B1 | 11/2002 | Veligdan et al. | 385/120 |

\* cited by examiner

*Primary Examiner*—David Gray
*Assistant Examiner*—Magda Cruz
(74) *Attorney, Agent, or Firm*—Reed Smith LLP; William J. McNichol, Jr.; Matthew J. Esserman (57) ABSTRACT

An ultrathin mesh optical panel and a method of use and making are disclosed. One embodiment of the optical panel includes a plurality of optical waveguides, wherein each optical waveguide is formed of a mesh material surrounding an optically clear core. The optical panel further includes a light generator. Each optical waveguide internally reflects the light incoming at the inlet of the waveguide to the outlet of the waveguide. The optical panel may optionally include a light redirecting coupling layer and/or a diffuser. An alternate embodiment of the ultrathin optical panel includes a plurality of optical waveguides, wherein the mesh material serves as the light transmissive material. A method of making and using is applicable to both major embodiments. A modification of either embodiment is disclosed wherein the optical waveguide is aligned to be non-perpendicular to the panel face.

99 Claims, 5 Drawing Sheets

ULTRATHIN MESH OPTICAL PANEL AND A METHOD OF MAKING AN ULTRATHIN MESH OPTICAL PANEL

BACKGROUND OF THE INVENTION

1. Field of the Invention

The present invention relates to optical displays, and, more particularly, to an ultrathin cellular display panel and a method of making an ultrathin cellular display panel.

2. Description of the Background

Optical screens typically use cathode ray tubes (CRTs) for projecting images onto the screen. The standard screen has a width to height ratio of 4:3 with 525 vertical lines of resolution. An electron beam is scanned both horizontally and vertically across the screen to form a number of pixels which collectively form the image.

Conventional cathode ray tubes have a practical limit in size, and are relatively deep to accommodate the required electron gun. Larger screens are available which typically include various forms of image projection. However, such screens have various viewing shortcomings, including limited viewing angle, resolution, brightness, and contrast, and such screens are typically relatively cumbersome in weight and shape. Furthermore, it is desirable for screens of any size to appear black when not illuminated, in order to improve viewing contrast. However, it is impossible for direct view CRTs to actually be black because they utilize phosphors to form images, and those phosphors are non-black.

Optical panels may be made, for example, by stacking waveguides. Such a panel may be thin in its depth compared to its height and width, and the cladding of the waveguides may be made black to increase the black surface area, but such a panel may also experience limitations in perceived brightness, due to the total internal reflection of light within each waveguide being controlled only in the vertical axis. Further, the presence of black cladding in only one direction may decrease the relative blackness, and thus the contrast, of the screen.

Therefore, the need exists for an optical panel which possesses the advantages corresponding to a stacked waveguide panel, and which does not experience a decrease in brightness or a decrease in contrast over conventional screens.

SUMMARY OF THE INVENTION

The present invention is directed to an ultrathin cellular optical panel. The optical panel includes a plurality of optical waveguides, wherein each optical waveguide is formed of a mesh material surrounding an optically clear core. One end of each core of each cell forms an inlet for the cell, and an opposite end of each core of each cell forms an outlet for the cell, and the plurality of inlets form an inlet face for the optical panel, and the plurality of outlets form an outlet face for the optical panel. The optical panel further includes a light generator that generates light incident on the inlet face. Each cell internally reflects the light incoming at the inlet of the cell to the outlet of the cell. The optical panel may additionally include a light redirecting coupling layer parallel to the inlet face that redirects light to couple the light into the inlet of each cell. Further, the optical panel may include a diffusing layer that spreads light exiting the outlet face to the desired viewing angle.

The present invention is also directed to a method of displaying light using an ultrathin cellular display panel. The method includes the steps of providing a plurality of optical waveguides, wherein each cell is formed of a mesh material surrounding an optical core, passing the light substantially perpendicularly to an inlet of the core of each cell, and displaying the light at an outlet of each cell opposite the inlet of each cell, wherein the light at the plurality of outlets forms an image. The method may additionally include the steps of positioning the inlets of each of the mesh screen cells proximate to a light redirecting coupling layer, wherein the light redirecting coupling layer redirects light incident at a substantially acute angle to each inlet into light incident substantially perpendicular to each inlet, and optionally inserting a bond material, such as an adhesive, liquid, or gel, having a higher index of refraction than the mesh material between the mesh screen cells and the light redirecting coupling layer. Further, the method may include the steps of positioning a diffusing layer proximate to the outlets of each of the mesh screen cells, wherein the diffusing layer diffuses the light exiting the plurality of outlets to form the image, and optionally inserting a bond material, such as a transparent adhesive, liquid, or gel, having a similar or identical index of refraction than the optically transmissive cell optical cores between the mesh screen and the diffusing layer.

The present invention solves problems experienced in the prior art, such as the required use of expensive and cumbersome projection equipment, and the great depth of optical panels requiring such projection equipment, due to the provision of total internal reflection of light within each optical waveguide in both the vertical and horizontal directions, thereby improving panel perceived brightness and contrast while maintaining the minimized depth advantages which correspond to a stacked waveguide panel.

Those and other advantages and benefits of the present invention will become apparent from the following detailed description of the invention.

BRIEF DESCRIPTION OF THE SEVERAL VIEWS OF THE DRAWINGS

For the present invention to be clearly understood and readily practiced, the present invention will be described in conjunction with the following figures, wherein:

FIG. 4b is an enlarged side view cross sectional schematic of the mesh screen cells illustrated in FIG. 4a;

FIG. 5b is a side view cross sectional schematic of the stackup of layers illustrated in FIG. 5a.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical display panel.

Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
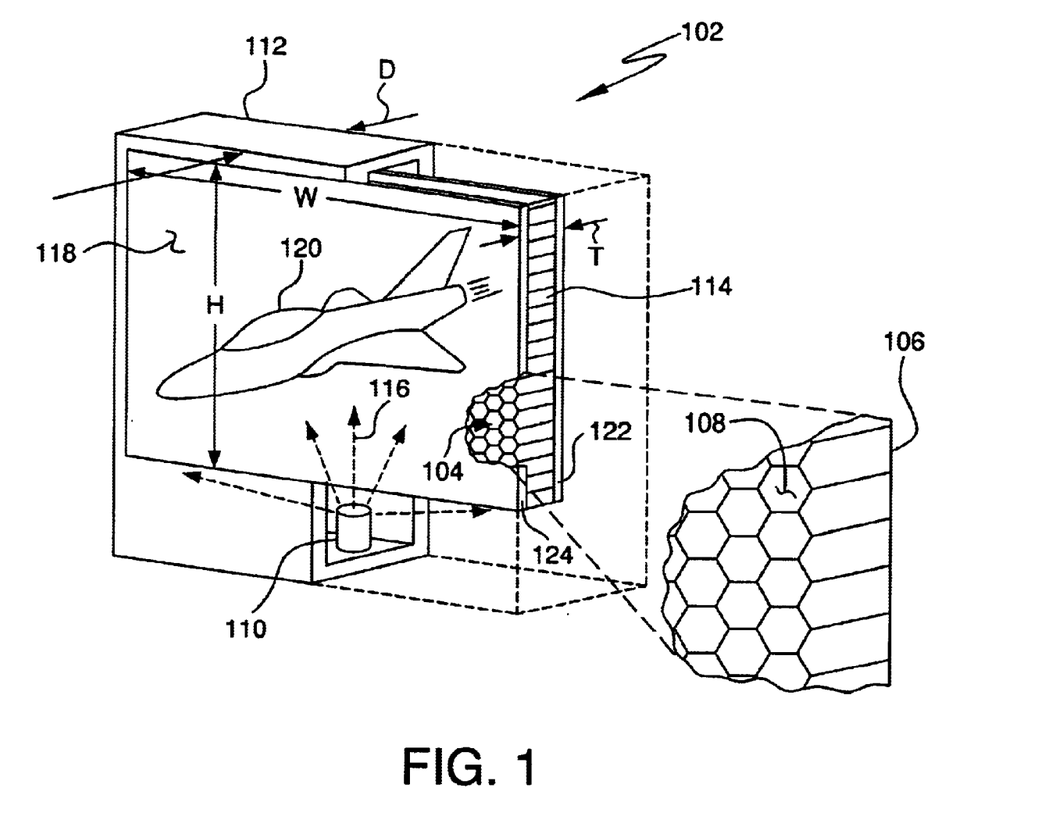
FIG. 1 is an isometric view schematic illustrating an ultrathin cellular optical panel.

FIG. 1 is an isometric view schematic illustrating an optical panel 102. The optical panel 102 includes a mesh screen layer 104 forming an array of cellular waveguides (herein called cells), wherein one end of each cell forms an inlet 106 for that cell, and wherein the opposite end of each cell forms an outlet 108 for that cell, and wherein each cell totally-internally reflects light incoming at the inlet of the cell to the outlet of that same cell thus acting as a cellular waveguide for light. The panel preferably further includes a light generation system 110, and may include a housing 112 in which the light generation system 110 and the mesh screen are mounted.

Each cell within the mesh screen 104 extends horizontally and vertically. The mesh screen cell inlet ends 106, optionally covered by a light redirecting coupling layer 122, define an inlet face 114 for receiving image light 116. The mesh screen cell outlet ends 108, optionally covered by a diffuser layer 124, define an outlet face 118 disposed substantially parallel with the inlet face 114 for displaying light 116. The light 116 may be displayed in a form such as, but not limited to, a video image 120.

The housing 112 may be sized larger in height and width than the combination of the light generation system 110 and the mesh screen 104, to allow the placement of the mesh screen 104 and light generation system 110 therein. The housing 112 has an open front to allow for viewing of the outlet face 118, and preferably has a closed rear opposite the open front. The housing 112 supports the mesh screen layer 104, and the light generation system 110, in a substantially closed enclosure. The outlet face 118 faces outwardly, and is exposed to the viewer and ambient light, and the inlet face 114 and light redirecting coupling layer 122 face inwardly toward the preferably black surfaces within the housing 112, thereby providing additional black for contrast at the outlet face 118. This additional black is provided at the outlet face 118 due to the preferably passive nature of the mesh screen layer 104. When passive devices are enclosed in a black area, the outlet face will appear black when not illuminated by image light 116 incident on the inlet face 114.

The light generation system 110 generates light 116 and passes the light to outlet face 118. The light generation system 110 may be a white light projector, or may include a light source, such as a LED, and/or a light modulator, and/or imaging optics, such as a video or movie projector. The light 116 may be initially generated, for example, by the light source. The light source may be, for example, a bright incandescent bulb, an arc lamp, an RF excited gas discharge lamp, any solid state light source, or any phosphorescent, luminescent, or incandescent light source. The light source may also be a coherent light source, such as a laser. The light source may also be polarized. The light 116 from the source may then be modulated by the modulator for defining individual picture elements, known in the art as pixels. Alternatively, the light 116 may define a simple lighted item, such as an on/off switch. The imaging optics may include light folding mirrors and/or lenses. The imaging optics may be optically aligned for compressing or expanding and focusing the light 116 as required to fit the inlet face 114. The light 116, after entry into the inlet face 114, travels to the outlet face 118. The light 116 is passed into each cell within the mesh screen 104 at the critical angle for total internal reflection or lower, and is thus directed generally horizontally into the inlet 106 of each cell.

The parallel surfaces of the inlet face 114 and the outlet face 118, and the acute angle at which the light generation may occur, allow the elements between the inlet and outlet faces, the light generating system, and the enclosing housing to be made ultrathin in depth. The cellular panel between the inlet and outlet faces has a nominal thickness T, which is the depth of at least the mesh screen layer 104 between the inlet face 114 and the outlet face 118, and may optionally include the thickness of the diffusing layer 124 and coupling layer 122, and which is substantially less than the height H and width W of the outlet face 118. The panel 102 may be configured in typical television width to height ratios of 4:3 or 16:9, for example. The depth D may vary accordingly with the thickness T.

Figure 2:
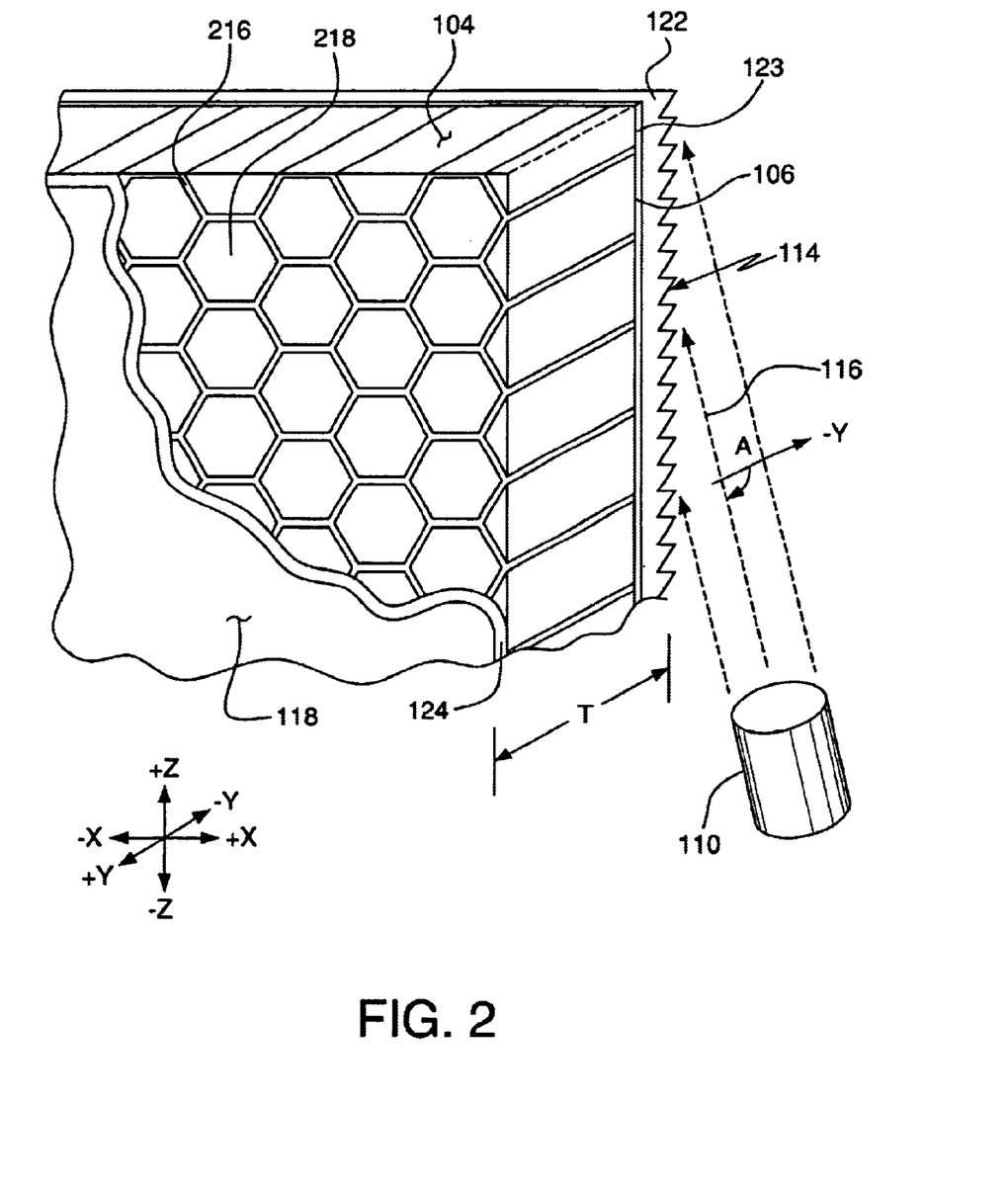
FIG. 2 is an isometric view illustrating layers used in the formation of the ultrathin cellular display panel.

FIG. 2 is an isometric view illustrating the layers, including the mesh screen layer 104, preferably used in the formation of the ultrathin cellular display panel of FIG. 1. Referring now to FIG. 2, the layers preferably include a light redirecting coupling layer 122, which couples the light 116 into the inlet 106 of each cell, a bond material 123, which bonds or couples the adjacent layers, and the mesh screen layer 104. The layers may additionally include a diffuser 124, such as a tinted plastic, glass, epoxy, polyurethane or polymer diffusing layer, that spreads light 116 exiting the outlet face 118 to the desired viewing angle.

The light redirecting coupling layer 122 redirects incident light 116 from the light source into the individual inlets of the cells, which light redirecting coupling layer 122 allows for a reduction in the FIG. 1 depth D of the FIG. 1 housing 112. Returning now to FIG. 2, this reduction allowance occurs where the light redirecting coupling layer 122 is configured for directing the light 116 from the light generator 110, which light generator 110 is placed within the FIG. 1 housing 112 proximate to the vertical placement of the mesh screen layer 104, into the light redirecting layer 122, which light redirecting layer 122 then acutely turns the light 116 into the cell inlets 106. The light redirecting coupling layer 122 is preferably effective for turning the image light 116 in an exemplary range of about 45° up to about 90° from an axis perpendicular to the mesh screen layer 104, as in angle A, in order to generate light transmission through the mesh screen layer 104. The light redirecting coupling layer 122 may be, for example, a light redirecting film, a diffractive element, a holographic element (holographic diffuser), or a TRAF™ (i.e. a type of light redirecting film) made of a plastic, glass, epoxy, polyurethane or polymer based materials. The light redirecting coupling layer 122 may be suitably bonded to the mesh screen layer 104 via bond material layer 123 in any manner known to those in the art, such as via use of an adhesive, liquid, gel, or an optically transparent epoxy. In an embodiment where a thermal bond is used as the method of bonding the light redirecting coupling layer 122 to the mesh screen 104, then the bond material layer 123 would be unnecessary. The bonding layer would also be unnecessary in an embodiment where a process of embossing, stamping, or molding of the cell inlet surface 106 had the effect of adding the functional shape of a light redirecting layer 122 directly to the inlet face 106 of the mesh screen 104. This molding could be accomplished using any curable adhesive, plastic, or epoxy. Additionally, it will be apparent to those skilled in the art that the light redirecting coupling layer 122 and any bonding layer 123 is not necessary in an embodiment wherein the light is not generated at an acute angle A to the plurality of cell layer 104 cell inlets 106, but rather is incident substantially parallel to the Y axis and thus perpendicular to the inlet face 106 of the cells of the mesh screen layer 104. The mesh screen layer 104 may be formed using a sheet of mesh structural material, for example, by a black mesh sheet material 216, wherein each cell in the mesh screen layer 104 is formed of a core 218 surrounded by the mesh sheet material 216. As used herein, black includes all dark, optically black, or opaque colors that absorb light, such as, but not limited to black, blue, purple, green, etc. The term "optically black" refers to a material which appears black and opaque on visual inspection, but which is composed at least in part of light transmissive material and which is capable of functioning as a waveguide component when used in conjunction with a light transmissive material having an appropriate index of refraction. For example, an optically black material may be formed from glass or plastic in which opaque particles, such as carbon black, have been dispersed. Such an article will appear black on visual inspection. However, the glass or plastic matrix remains transmissive, and when this material is used as the outer component of a waveguide, the clear glass can cause total internal reflection of the light carried through the waveguide. This is possible because the clear material need be only nanometers in thickness to serve this function. Referring once again to FIG. 2, the mesh sheet material 216 is structurally an arrangement of material characterized by an array of openings where the frames of the openings serve as structure for the individual cells. The mesh sheet material 216 may be a single piece of material that is perforated or stamped to form the cell openings. Alternately, the mesh sheet material 216 may be standard honeycomb, bugscreen, window or door screen, or a woven mesh. The mesh sheet material 216 may be formed of, for example, any material having a lower index of refraction than the core 218. For example, the mesh sheet material 216 may be a suitable metal, glass, plastic, polyurethane, polymer, or epoxy. The mesh sheet material may be for example, an optically black, opaque or pigmented plastic door or window screen. Regardless of the material used, the mesh sheet material 216 may be coated or cladded with a material of low refractive index to approach the goal of total internal reflection within the mesh sheet cell cores. Light absorption within each cell core 218 occurs in both the vertical and horizontal directions. The cell core 218 is preferably filled with a cell-fill material that is an optically clear material, such as a plastic, glass, liquid, gel, transparent epoxy, or a combination of liquids having a higher index of refraction than the mesh sheet material 216, wherein the optically clear material is at least substantially surrounded by the mesh sheet material 216. The term optically clear describes a material which appears transparent and is not translucent. The geometry of the mesh sheet material 216 may be any suitable shape that provides a waveguide for light. For example, the mesh sheet material 216 may be shaped so that any given cell is any one of, or a combination of, rounded or multiple sided geometric shapes such as circles, ellipses, triangles, quadrilaterals, pentagons, hexagons, heptagons, octagons, or the like. FIG. 2 is exemplary of the use of a hexagonal cell geometry.

The diffusing layer 124 spreads light 116 exiting the outlet face 118 to the desired viewing angle. The diffusing layer 124 may be tinted to further enhance the contrast of the display panel outlet face 118. As an alternate to a diffusing layer, the diffuser function may be added to the mesh screen outlet face by either etching or sandblasting the mesh screen outlet face. It will be apparent to those skilled in the art that, while the diffusing layer 124 is preferred in order to enhance image appearance to the viewer, it is not a required layer for the operation of the present invention.

Figure 3:
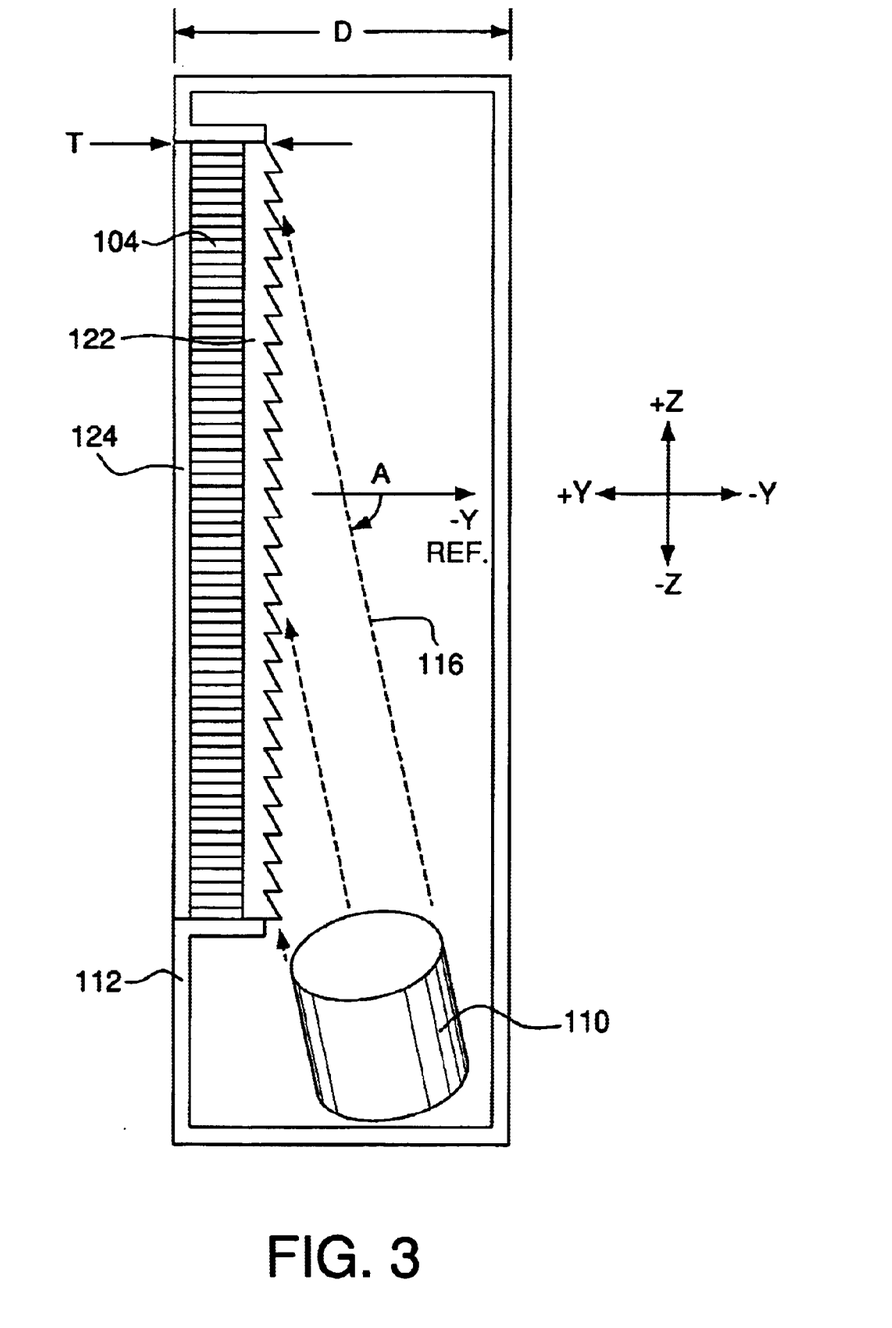
FIG. 3 is a side view cross sectional schematic of an ultrathin cellular display panel.

FIG. 3 is a cross sectional side view schematic illustrating an ultrathin cellular optical panel. The cellular panel of FIG. 3 includes a mesh screen 104, a light redirecting coupling layer 122, a diffuser layer 124, a light generation system 110, and a housing 112.

The light generator 110, in one embodiment of the present invention, is optically aligned with a light redirecting coupling layer 122. An image is projected onto the light redirecting coupling layer 122, and is then redirected for transmission through the mesh screen layer 104 for display on the outlet face of the diffuser layer 124. In a preferred embodiment, the light generator 110 is disposed adjacent to the top or bottom of the inlet face of the light redirecting coupling layer 122 for projecting the image light 116 at a substantially acute angle thereto, and is spaced therefrom a distance sufficient to allow for a turning of the image light 116 by the light redirecting coupling layer 122 for transmission through the cells of the mesh screen layer 104.

The allowable incidence angle A of the image light 116 on the light redirecting coupling layer 122 is determined by the capability of the coupling layer 122 to turn the light 116 into the inlet face of the mesh screen layer 104. The greater the turning capability of the coupling layer 122, the closer the light generator 110 may be mounted to the coupling layer 122 for reducing the required depth D of the housing 112.

One embodiment of the method of displaying light on the ultrathin cellular display panel utilizes the mesh screen layer 104 of FIG. 1. Although the diffusing and light redirecting coupling layers 124, 122 are shown in FIG. 1, the basic operation of the method of image display as set forth herein, without the inclusion of the diffusing 124 and coupling 122 layers, will be apparent from the description hereinbelow.

A mesh screen layer 104 is provided. Light is passed substantially perpendicularly to an inlet face of the core of each cell and the light is displayed at an outlet end 108 of each cell opposite the inlet end 106 of each cell, wherein the light at the plurality of cell outlets forms an image 120.

Figure 4A:
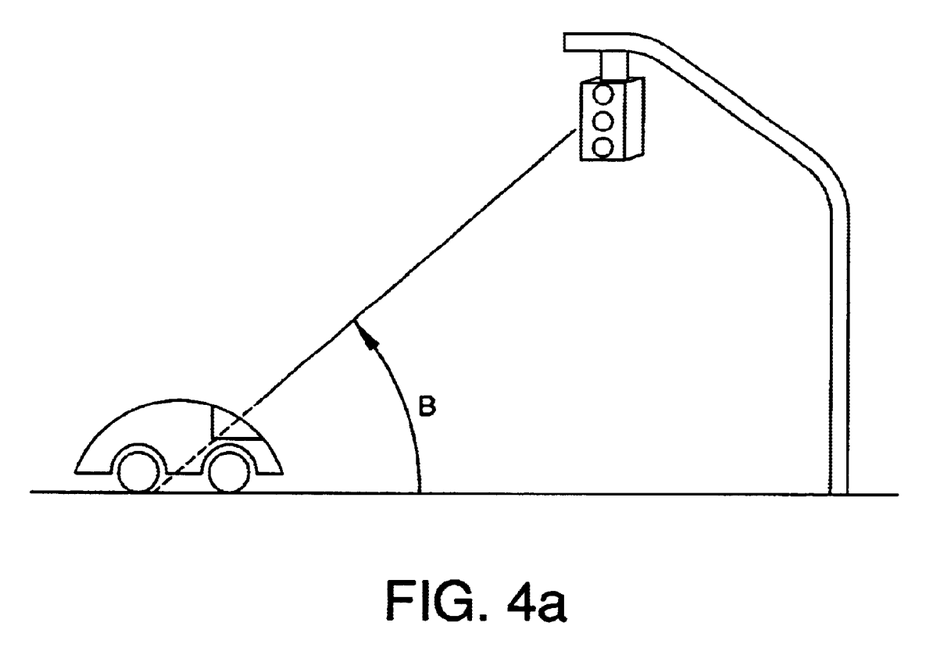
FIG. 4a is a depiction of an embodiment including a traffic light, which requires a tilted assembly of the mesh screen cells.
Figure 4B:
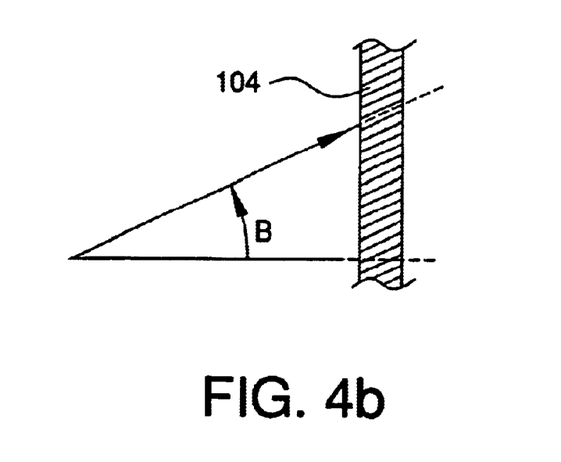

Most applications include an arrangement of the mesh screen cell that are essentially parallel to local horizontal. Such applications provide viewing of the display by observers who are generally in front of the display and at roughly the same height. However, some applications of the ultrathin cellular optical display panel may be intended for viewing of the display when the observer is located below but in front of the display. Alternately, the observer may be viewing the display at any elevation, but also at any side (left or right) angle. FIG. 4*a* is such an exemplary embodiment of an elevated display. Here, the ultrathin optical panel is being used as a traffic light. In such an embodiment, the most direct viewing angle for the observer is depicted by angle B. Consequently, the ultrathin cellular panel for such an embodiment may have the mesh screen cells tilted with respect to local horizontal to accommodate the general line of sight of the observer. FIG. 4*b* depicts the mesh screen 104 assembled such that the cores of the cells are tilted at an angle B with respect to local horizontal for viewing by an observer who is below and in front of the ultrathin display. Other applications of a downward-tilted display are overhead signs on roads or inside airplanes, bus and train terminals. Only the mesh screen 104 is depicted in FIG. 4*b* for clarity. Naturally, if the observer were above the ultrathin display, the angle of the cores of the mesh screen would be assembled upwards to accommodate an optimum display view to the observer such as in a theater where patrons looked down at the display screen.

In a preferred embodiment, the mesh screen layer 104 is sandwiched between the diffusing layer 124 and the light redirecting coupling layer 122. The sandwiching steps preferably include the insertion of, for example, a liquid glue, such as an epoxy, between the layers. For example, liquid epoxy Epotec 301 form Epoxy Technology, Inc. may be used. The liquid glue preferably has a higher index of refraction than the mesh material, and the liquid glue adheres the layers together, while also filling in the areas between the mesh to thereby form the cores of the respective cells. The liquid glue may be inserted, for example, by immersion of the layers in a volume containing the glue, or by an insertion of a glue layer between each layer as the layers are placed, for example, and the glue may be cured such as by the step of baking the assembly. In alternative embodiments, the layers may be fastened using materials other than liquids, such as pressure sensitive adhesive. In an embodiment wherein a pressure sensitive adhesive is used, the method preferably additionally includes the step of applying pressure to the layers sufficient to cause the adhesive to adhere the layers. It will be apparent to those skilled in the art that, regardless of the type of inter-layer bond material or method of adhesion used, the bond material as well as the core material is preferably optically clear.

Figure 5A:
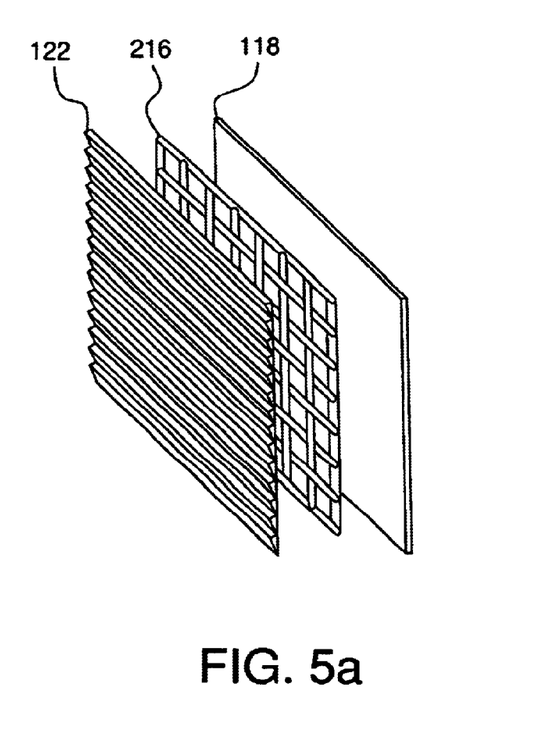
FIG. 5a is an exploded depiction of a stackup of layers where the mesh material is the transmissive element.
Figure 5B:
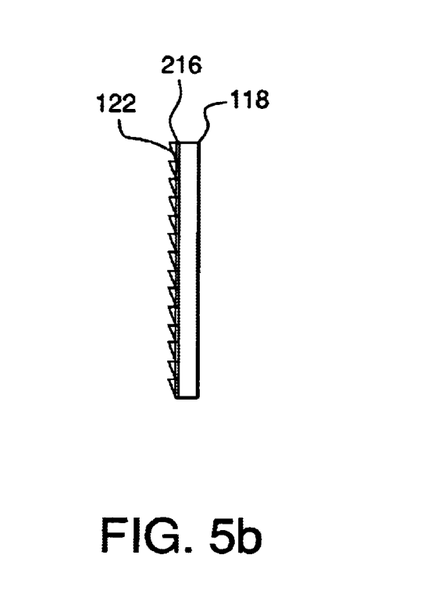

In an alternate embodiment, the stackup of layers shown in FIG. 5*a* includes a mesh sheet material 216 which may be optically clear as opposed to optically black, so that the mesh material itself is the optically transmissive material. The bonding material or adhesive may be optically black and a lower index of refraction than the mesh sheet material itself. An example would be the use of a material for the mesh sheet material which has a high index of refraction of about 1.6. This example index is so high that it allows a wide range of materials to be used as the adhesive, one possible core and/or interlayer bond material, that could have a lower index and still remain optically black. The stacking of an embodiment with a transmissive mesh sheet material is shown in FIG. 5*b*.

Those of ordinary skill in the art will recognize that many modifications and variations of the present invention may be implemented. The foregoing description and the following claims are intended to cover all such modifications and variations.

What is claimed is:

1. An optical panel, comprising:

a mesh screen; and an image light generator;

wherein the mesh screen comprises a mesh material having an array of openings filled with an optically transparent material forming cell cores having a refractive index higher than that of said mesh material, said mesh material and cell cores forming an array of optical waveguides producing total internal reflection of light within each waveguide, wherein one end of each cell core forms an inlet for the waveguide and the opposite end of each cell core forms an outlet for the waveguide, wherein the plurality of inlets form an inlet face for the mesh screen, the plurality of outlets form an outlet face for the mesh screen, and wherein the image light generator generates image light incident on the inlet face and forms an image at the outlet face.

2. The optical panel of claim 1, wherein the cell cores of the optical waveguides are aligned to be perpendicular to said outlet face to permit viewing of the image at the outlet face by an observer positioned directly in front of the optical panel.

3. The optical panel of claim 1, wherein the cell cores of the optical waveguides are aligned to be non-perpendicular in both or either of vertical or horizontal directions to said outlet face to permit viewing of the image at the outlet face by an observer positioned both or either at a higher or lower elevation or to the left or right of the optical panel.

4. The optical panel of claim 1, wherein said mesh material is optically black.

5. The optical panel of claim 1, wherein said mesh material is coated or cladded with an optically black material.

6. The optical panel of claim 1, wherein said mesh material is formed of a material selected from the group consisting of a metal, glass, a plastic, a polyurethane, a polymer, and an epoxy.

7. The optical panel of claim 1, wherein the material used for said cores is selected from the group consisting of an optically clear plastic, an optically clear glass, an optically clear adhesive, and a combination of liquids having a higher index of refraction than the mesh material.

8. The optical panel of claim 1, further comprising a housing, wherein said housing mechanically supports said mesh screen and said light generator, said housing having an open front at which is mounted the outlet face, and has a closed rear at a side of the housing opposite the open front, wherein said light generator and the inlet face are positioned between the open front and the closed rear.

9. The optical panel of claim 8, wherein the interior of said housing is black in color.

10. The optical panel of claim 1, wherein the image light on the outlet face is displayed as a video image.

11. The optical panel of claim 1, wherein said image light generator comprises a white light projector.

12. The optical panel of claim 1, wherein said image light generator comprises a light source, at least one light modulator, and at least one imaging optic.

13. The optical panel of claim 12, wherein the at least one imaging optic is optically aligned to reflect and focus the light to fit the inlet face.

14. The optical panel of claim 12, wherein the light source is selected from the group consisting of an incandescent bulb, an arc lamp, an RF excited gas discharge lamp, and a solid state light emitting device.

15. The optical panel of claim 12, wherein the light source is coherent.

16. The optical panel of claim 15, wherein the light source is a laser.

17. The optical panel of claim 12, wherein the light source is selected from the group consisting of a phosphorescent, a luminescent, and an incandescent light source.

18. The optical panel of claim 1, further comprising at least one light redirector proximally positioned to the mesh screen, wherein the light is incident at a non-perpendicular angle to the said at least one light redirector, and wherein said at least one light redirector redirects the light to be roughly perpendicular to said inlet face allowing light to enter said inlet face and be totally internally reflected within said optical waveguides.

19. The optical panel of claim 18, wherein said image light generator directs the light into said at least one light redirector, and wherein the light is directed at an angle in the range of about 45° up to about 90° from an axis perpendicular to said at least one light redirector.

20. The optical panel of claim 18, wherein said at least one light redirector is selected from the group consisting of a light redirecting film, a diffractive element, and a holographic diffuser.

21. The optical panel of claim 18, wherein said at least one light redirector is connected to said inlet face.

22. The optical panel of claim 21, wherein said at least one light redirector is bonded to said inlet face via an optically clear adhesive, liquid, gel, epoxy, or a thermal bond.

23. The optical panel of claim 18, wherein said at least one light redirector is molded, stamped, or embossed into the inlet face of the mesh screen.

24. The optical panel of claim 1, wherein the cores are made of a material selected from the group consisting of a plastic, glass, liquid, gel, transparent epoxy, and transparent adhesive.

25. The optical panel of claim 1, further comprising at least one light diffuser which spreads light exiting the outlet face to a desired viewing angle, wherein the at least one light diffuser is proximately positioned to said outlet face.

26. The optical panel of claim 25, further comprising at least one light redirector proximately positioned to said inlet face.

27. The optical panel of claim 26, wherein said at least one light redirector is connected to said inlet face and said at least one light diffuser is connected to said outlet face.

28. The optical panel of claim 27, further comprising a housing which mechanically supports said light generator, said mesh screen, said at least one light redirector, and said at least one light diffuser.

29. The optical panel of claim 25, wherein said at least one light diffuser is connected to said outlet face.

30. The optical panel of claim 29, wherein said at least one light diffuser is bonded to said mesh screen outlet face via an optically clear adhesive or thermal bond.

31. The optical panel of claim 1, further comprising a light diffusing function at said outlet face made by the process of etching or sandblasting said outlet face to impart a light diffusing property at said outlet face.

32. The optical panel of claim 1, wherein the mesh material is selected from the group consisting of a honeycomb sheet, bug screen, window screen, door screen, and woven mesh.

33. The optical panel of claim 1, wherein each opening within the mesh material forms a corresponding cell core shape selected from the group consisting of circles, ellipses, triangles, quadrilaterals, pentagons, hexagons, heptagons, octagons, and combinations thereof.

34. An optical panel, comprising:
   a mesh screen; and
   an image light generator;
   wherein the mesh screen comprises a mesh material having an array of openings filled with a material forming cell cores having a refractive index lower than that of the mesh material, the mesh material being more light transmissive than the cell cores, said mesh material and cell cores forming an array of optical waveguides producing total internal reflection of light within each waveguide, wherein one end of said mesh material forms an inlet for the waveguide, wherein an opposite end of said mesh material forms an outlet for the waveguide, wherein the plurality of inlets form an inlet face for the mesh screen, and wherein the plurality of outlets form an outlet face for the mesh screen, and wherein the image light generator generates image light incident on the inlet face and forms an image at the outlet face.

35. The optical panel of claim 34, wherein said mesh material is optically clear.

36. The optical panel of claim 34, wherein said mesh material is formed of a material selected from the group consisting of a glass, a plastic, a polyurethane, a polymer, and an epoxy.

37. The optical panel of claim 34, wherein the core is selected from the group consisting of an optically black plastic, an optically black glass, and an optically black adhesive.

38. The optical panel of claim 34, further comprising a housing, wherein said housing mechanically supports said mesh screen and said light generator, said housing having an open front at which is mounted the outlet face, and has a closed rear at a side of the housing opposite the open front, wherein said light generator and the inlet face are positioned between the open front and the closed rear.

39. The optical panel of claim 38, wherein the interior of said housing is black in color.

40. The optical panel of claim 34, wherein the image light on the outlet face is displayed as a video image.

41. The optical panel of claim 34, wherein said image light generator comprises a white light projector.

42. The optical panel of claim 34, wherein said image light generator comprises a light source, at least one light modulator, and at least one imaging optic.

43. The optical panel of claim 42, wherein the at least one imaging optic is optically aligned to reflect and focus the light to fit said inlet face.

44. The optical panel of claim 42, wherein said light source is selected from the group consisting of an incandescent bulb, an arc lamp, an RF excited gas discharge lamp, and a solid state light emitting device.

45. The optical panel of claim 42, wherein said light source is coherent.

46. The optical panel of claim 42, wherein said light source is selected from the group consisting of a phosphorescent, a luminescent, and an incandescent light source.

47. The optical panel of claim 34, further comprising at least one light redirector proximally positioned to said mesh screen, wherein the image light is incident at a non-perpendicular angle to the said at least one light redirector, and wherein said at least one light redirector redirects the light to be roughly perpendicular to said inlet face allowing light to enter said inlet face and be totally internally reflected within said optical waveguides.

48. The optical panel of claim 47, wherein said image light generator directs the light into said at least one light redirector, and wherein the image light is directed at an angle in the range of about 45° up to about 90° from an axis perpendicular to said at least one light redirector.

49. The optical panel of claim 47, wherein said at least one light redirector is selected from the group consisting of a light redirecting film, a diffractive element, and a holographic diffuser.

50. The optical panel of claim 47, wherein said at least one light redirector is connected to said inlet face.

51. The optical panel of claim 50, wherein said at least one light redirector is bonded to said inlet face via either an optically black adhesive or a thermal bond.

52. The optical panel of claim 47, wherein said at least one light redirector is molded, stamped, or embossed into said inlet face.

53. The optical panel of claim 34, further comprising at least one light diffuser proximately positioned to said outlet face, said at least one light diffuser spreading light exiting said outlet face to a desired viewing angle.

54. The optical panel of claim 53, further comprising at least one light redirector proximately positioned to said inlet face.

55. The optical panel of claim 54, wherein said at least one light redirector is connected to said inlet face and said at least one light diffuser is connected to said outlet face.

56. The optical panel of claim 55, further comprising a housing which mechanically supports said light generator, said mesh screen, said at least one light redirector, and said at least one light diffuser.

57. The optical panel of claim 53, wherein said at least one light diffuser is connected to said outlet face.

58. The optical panel of claim 57, wherein said at least one light diffuser is bonded to said outlet face via an optically black adhesive or thermal bond.

59. The optical panel of claim 34, further comprising a light diffusing function at said outlet face made by the process of etching or sandblasting said outlet face to impart a light diffusing property at said outlet face.

60. The optical panel of claim 34, wherein the mesh material is selected from the group consisting of a honeycomb sheet, bug screen, window screen, door screen, and woven mesh.

61. The optical panel of claim 34, wherein each opening within the mesh material forms a corresponding cell core shape selected from the group consisting of circles, ellipses, triangles, quadrilaterals, pentagons, hexagons, heptagons, octagons, and combinations thereof.

62. A method of displaying image light using an optical display panel, comprising:
  providing an array of optical waveguides, wherein the optical waveguides are formed with the use of a mesh material;
  passing the image light substantially perpendicularly to inlets of the optical waveguides, wherein the image light exhibits total internal reflection within the optical waveguides; and
  displaying the image light at outlets of the optical waveguides opposite the inlets of the optical waveguides, wherein the image light displayed at the outlets forms an image.

63. The method of claim 62, wherein:
  the image light is projected first onto a light redirector positioned at the inlets of the optical waveguides, wherein the light redirector redirects image light which is not substantially perpendicular to said inlets so that it is substantially perpendicular to said inlets.

64. The method of claim 63, wherein:
  the image at the outlets of the optical waveguides is further transmitted through a diffuser which spreads light exiting the outlets to a desired viewing angle.

65. The method of claim 62, wherein:
  the image light is incident on the optical panel at an angle of between 45 degrees and 90 degrees with respect to an alignment of cell cores of the optical waveguides.

66. The method of claim 62, wherein:
  the image at the outlets of the optical waveguides is further transmitted through a diffuser which spreads light exiting the outlets to a desired viewing angle.

67. The method of claim 62, wherein the mesh material is selected from the group consisting of a honeycomb sheet, bug screen, window screen, door screen, and woven mesh.

68. The method of claim 62, wherein openings within the mesh material form a corresponding optical waveguide shape selected from the group consisting of circles, ellipses, triangles, quadrilaterals, pentagons, hexagons, heptagons, octagons, and combinations thereof.

69. A method of making an optical panel comprising:
  filling openings in a mesh material with a cell-fill material to form cores in a mesh screen, wherein the cell-fill material has either a lower refractive index or a higher refractive index than the mesh material, wherein either the cell-fill material having the higher refractive index or the mesh material having the higher refractive index is optically transmissive and becomes the optically transmissive portion of an optical waveguide in the mesh screen, wherein light transmitted through the optical waveguide exhibits total internal reflection, and wherein a plurality of optical waveguide inlets form an inlet face and a plurality of optical waveguide outlets form an outlet face.

70. The method of claim 69, wherein the cell-fill material has a higher refractive index than said mesh material and therefore the cores perform as the optically transmissive portion of the optical waveguide.

71. The method of claim 70, wherein the mesh material is pigmented, coated, or cladded with a material that has a lower index of refraction than the cell-fill material.

72. The method of claim 70, wherein the cell-fill material is a material selected from the group consisting of a plastic, glass, liquid, gel, transparent epoxy, and transparent adhesive.

73. The method of claim 69, wherein the cell-fill material has a lower refractive index than said mesh material and therefore said mesh material performs as the optically transmissive portion of the optical waveguide.

74. The method of claim 69, wherein a starter material is perforated or stamped to form the openings in the mesh material.

75. The method of claim 69, wherein the mesh material is selected from the group consisting of a metal, glass, plastic, polyurethane, polymer, and epoxy.

76. The method of claim 69, wherein the mesh material is selected from the group consisting of a honeycomb sheet, bug screen, window screen, door screen, and woven mesh.

77. The method of claim 69, further comprising embossing or stamping a light redirecting coupling layer function onto the plurality of optical waveguide inlets.

78. The method of claim 69, further comprising molding a light redirecting coupling layer function onto the plurality of optical waveguide inlets using a curable adhesive, plastic, or epoxy.

79. The method of claim 69, further comprising:
  positioning a diffuser proximate to the outlet face, wherein the diffuser spreads the light exiting the optical waveguide outlets to form an image on the diffuser layer at a desired viewing angle.

80. The method of claim 79, further comprising attaching the diffuser to the outlet face.

81. The method of claim 80, wherein said attaching comprises inserting an adhesive between the outlet face and the diffuser, wherein the adhesive bonds the outlet face to the diffuser, and wherein the adhesive forms none, at least a portion, or all of the light transmissive path of each optical waveguide.

82. The method of claim 81, further comprising curing the adhesive.

83. The method of claim 82, wherein said curing comprises either baking or exposure to ultraviolet light.

84. The method of claim 81, wherein said inserting comprises immersing the mesh material and the diffuser in the adhesive.

85. The method of claim 81, wherein said inserting comprises inserting the adhesive between the outlet face and the diffuser prior to said positioning.

86. The method of claim 80, wherein said attaching comprises applying pressure to the panel sufficient to cause adhesion of the outlet face to the diffuser.

87. The method of claim 80, wherein said attaching comprises thermally bonding the diffuser to the outlet face.

88. The method of claim 69, further comprising:
forming a diffuser function at the optical waveguide outlets by either etching or sandblasting the optical waveguide outlets to impart a light diffusing property at the optical waveguide outlets.

89. The method of claim 69 further comprising:
positioning the inlet face proximate to a light redirecting coupling layer which redirects light which is non-perpendicular to the inlet face such that the light becomes substantially perpendicular to the inlet face, and attaching the light redirecting coupling layer to the inlet face.

90. The method of claim 89, wherein the light redirecting coupling layer is made from a material selected from the group consisting of a plastic, glass, epoxy, polyurethane, and polymer.

91. The method of claim 89, wherein the light redirecting coupling layer is selected from the group consisting of a light redirecting element, light redirecting film, a diffractive element, and a holographic diffuser.

92. The method of claim 89, wherein said attaching of the light redirecting layer to the inlet face includes inserting an adhesive between the inlet face and the light redirecting coupling layer, wherein the adhesive forms none, at least a portion, or all of the light transmissive portion of the optical waveguide.

93. The method of claim 92, further comprising curing the adhesive.

94. The method of claim 93, wherein said curing comprises either baking or exposure to ultraviolet light.

95. The method of claim 92, wherein said inserting comprises immersing the mesh material and the light redirector in the adhesive.

96. The method of claim 92, wherein said inserting comprises inserting the adhesive between the inlet face and the light redirector prior to said positioning.

97. The method of claim 89, wherein said attaching comprises applying pressure to the panel sufficient to cause adhesion of the inlet face and the light redirecting coupling layer.

98. The method of claim 89, wherein said attaching comprises thermally bonding the light redirecting coupling layer to the inlet face.

99. The method of claim 69, wherein each opening within the mesh material forms a corresponding core shape selected from the group consisting of circles, ellipses, triangles, quadrilaterals, pentagons, hexagons, heptagons, octagons, and combinations thereof.

* * * * *